(12) United States Patent
Patil

(10) Patent No.: US 10,158,891 B1
(45) Date of Patent: Dec. 18, 2018

(54) PREFETCHER WITH ADAPTIVE STREAM SEGMENT PREFETCH WINDOW BASED ON CLIENT ASSOCIATED THRESHOLDS

(71) Applicant: Verizon Digital Media Services Inc., Dulles, VA (US)

(72) Inventor: Ravikiran Patil, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 15/614,067

(22) Filed: Jun. 5, 2017

(51) Int. Cl.
| | |
|---|---|
| *G06F 13/00* | (2006.01) |
| *H04N 21/231* | (2011.01) |
| *H04N 21/239* | (2011.01) |
| *H04N 21/2183* | (2011.01) |
| *G06F 12/0862* | (2016.01) |
| *G06F 12/02* | (2006.01) |
| *H04L 29/08* | (2006.01) |

(52) U.S. Cl.
CPC ... *H04N 21/23106* (2013.01); *H04N 21/2183* (2013.01); *H04N 21/2393* (2013.01); *G06F 12/0215* (2013.01); *G06F 12/0862* (2013.01); *H04L 67/2847* (2013.01)

(58) Field of Classification Search
CPC ......... H04N 21/23106; H04N 21/2183; H04N 21/2393; H04L 67/2847; G06F 12/0215; G06F 12/0862

USPC .......... 711/213, 137; 712/207, 237
See application file for complete search history.

(56) References Cited

U.S. PATENT DOCUMENTS

| | | | |
|---|---|---|---|
| 2013/0097309 A1* | 4/2013 | Ma | H04L 29/08099 709/224 |
| 2013/0097402 A1* | 4/2013 | Bao | G06F 12/0862 711/205 |
| 2015/0172733 A1* | 6/2015 | Tokumo | H04N 21/2387 725/93 |
| 2015/0288617 A1* | 10/2015 | Dasher | H04L 47/801 709/226 |
| 2017/0054800 A1* | 2/2017 | DiVincenzo | H04L 67/1014 |
| 2018/0109643 A1* | 4/2018 | Patil | H04L 67/2847 |
| 2018/0183890 A1* | 6/2018 | Patil | H04L 65/601 |

* cited by examiner

*Primary Examiner* — Hong C Kim
(74) *Attorney, Agent, or Firm* — Ansari Katiraei LLP; Arman Katiraei; Sadiq Ansari

(57) ABSTRACT

An adaptive stream segment prefetcher changes the number of segments it prefetches following a client requested segment of the same stream based on conditions associated with that stream at prefetch time. The adaptive prefetcher increases or decreases the number of segments to prefetch for a particular stream based on the number of active or concurrent clients requesting that particular stream, based on the playback duration of the particular stream by one or more clients, or some combination of both. The adaptive prefetcher continuously monitors the conditions associated with the stream such that number of segments prefetched at a first time are greater or less than the number of segments prefetched at a later second time.

20 Claims, 6 Drawing Sheets

PREFETCHER WITH ADAPTIVE STREAM SEGMENT PREFETCH WINDOW BASED ON CLIENT ASSOCIATED THRESHOLDS

BACKGROUND ART

Media content represents images, video, audio, text, presentations, and other digital content that span some duration. The media content is streamed over a digital network, such as the Internet, to different network enabled clients (e.g., computers, tablets, smartphones, set-top boxes, etc.) by encoding the media content as a set of segments and performing a serialized delivery of the segments to the clients with each segment representing a short duration of the overall stream. The segmented encoding and delivery of the media content allows clients to start, resume, or skip to a particular playback position by simply requesting the segment corresponding to that particular position. The segmented encoding further allows clients to immediately switch between different encodings of the same media stream, wherein the different encodings provide the media stream at different bitrates or quality levels.

Providing an uninterrupted streaming experience is technically challenging because of the time sensitive manner with which the client-server exchange for segment delivery occurs. The client is continually requesting segments ahead of its current playback position to account for the network propagation time, server response time, and client rendering time. Any delay in the server response to a requested segment can result in interrupted playback or buffering at the client. This and other factors beyond server control, including network congestion, can disrupt the end user experience and ultimately cause the client to cease playback. Various server-side techniques attempt to mitigate playback issues on the client by improving the responsiveness with which the server obtains and sends segments in response to client requests for those segments.

One such technique is to locally cache the segments for a requested stream at the streaming server such that there is no additional retrieval of the segments from a remote location. Local caching becomes more impractical as the stream length or duration increases. Streams that are several minutes long and encoded with different bitrates can consume gigabytes worth of cache. The server may have insufficient memory for caching such large content or may not want to dedicate a large portion of memory to caching of a single stream, especially in a multi-tenant environment in which the server is tasked with serving other streams or content. Moreover, server performance would be adversely affected as other popular content or streams would be ejected from cache, causing the server to re-retrieve that content from remote storage in order to respond to received client requests. Locally caching is also wasteful when treating all streams or media content the same. In particular, cache resources would be wasted when consumed with a stream that is requested by one or a few clients.

Rather than cache the entire stream, an alternate technique for accelerating retrieval and serving of stream segments is to prefetch and cache a subset of segments ahead of a current client playback position. This technique is referred to as prefetching. Prefetching is also wasteful when treating all streams or media content the same. In particular, bandwidth is wasted in unnecessarily prefetching segments for a particular stream when there is a single or limited number of clients watching the stream and those clients prematurely end playback, switch to a different stream, or switch to a different bitrate encoding of the stream, and thereby never request the prefetched segments. In addition to wasted bandwidth, uniform prefetching also wastes caching resources as prefetched segments that are never requested simply sit and consume cache at the expense of other popular content that can be more efficiently served if in cache.

Accordingly, there is a need for a solution for accelerating the delivery of media content streams to clients without uniformly caching or prefetching segments of different streams. Stated differently, there is a need for a streaming solution that is adaptive based on stream demand and actual consumption.

BRIEF DESCRIPTION OF THE DRAWINGS

A preferred embodiment for a prefetcher with adaptive triggering and prefetch window will now be described, by way of example only, with reference to the accompanying drawings in which.

DETAILED DESCRIPTION

Disclosed are systems and methods for an adaptive prefetcher. The adaptive prefetcher is a stream segment prefetcher with adaptive triggering and an adaptive prefetch window, wherein the prefetch window sets the number of segments to prefetch and cache ahead of a client request for a particular segment of a stream. The adaptive prefetcher modifies its prefetching operations for different media content streams based on conditions associated with each stream at prefetch time. More specifically, the adaptive prefetcher modifies its prefetching operations by dynamically enabling and disabling segment caching for different streams based on real-time or current demand for those streams. The adaptive prefetcher also modifies it prefetch operations by dynamically increasing or decreasing the segment prefetch window for different streams based on real-time or current demand for those streams.

In some embodiments, the adaptive prefetcher's caching and prefetching operations are adapted for a particular stream according to demand derived from the number of active or concurrent clients requesting that particular stream. In some embodiments, the adaptive prefetcher's caching and prefetching operations are adapted for a particular stream according to demand derived from the playback duration of the particular stream by one or more clients. In some embodiments, the adaptive prefetcher adapts its caching and prefetching operations according to demand from a combination of the number of active clients requesting a particular stream and the playback duration of the particular stream by those clients.

Figure 1:
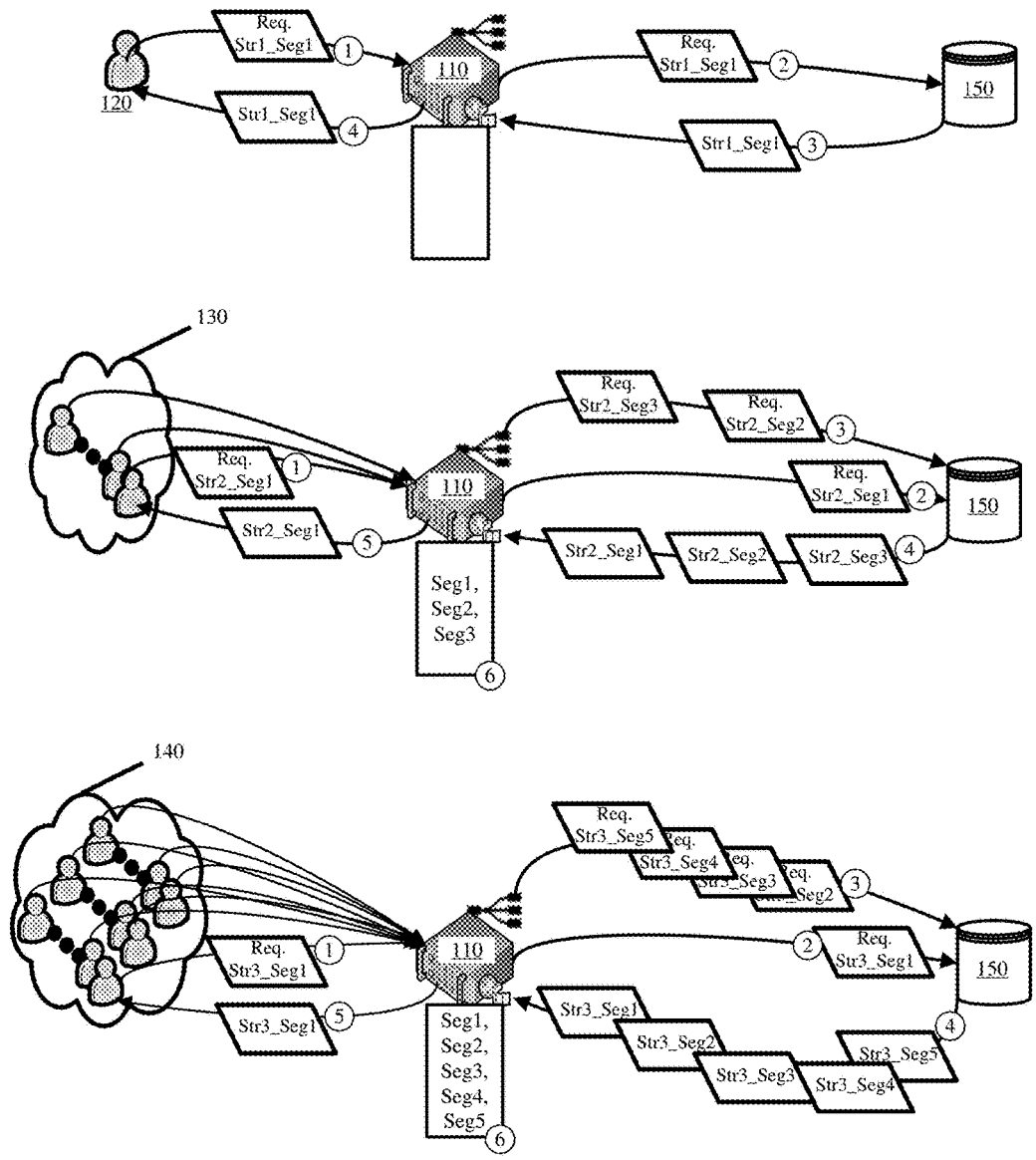
FIG. 1 conceptually illustrates adapting the segment prefetch window of the adaptive prefetcher based on demand derived from the number of requesting clients in accordance with some embodiments.

FIG. 1 conceptually illustrates adapting the segment prefetch window of the adaptive prefetcher 110 based on demand derived from the number of requesting clients in accordance with some embodiments. The figure illustrates different clients requesting segments for different streams from the adaptive prefetcher 110. In particular, a single client 120 requests segments of a first stream from the adaptive prefetcher 110, a first set of ten clients 130 concurrently or contemporaneously requests segments of a different second stream from the adaptive prefetcher 110, and a different second set of fifty clients 140 concurrently or contemporaneously requests segments of a different third stream from the adaptive prefetcher 110.

The adaptive prefetcher 110 disables caching and prefetching for the first stream in response to the demand from the single client 120 failing to exceed any thresholds set for enabling the prefetching operations. Segments of the first stream requested by the single client 120 are retrieved by the adaptive prefetcher 110 from remote storage 150 as the requests from the single client 120 arrive. The adaptive prefetcher 110 does not cache any of the retrieved segments for the first stream due to the single client 120 representing minimal demand for the first stream. The adaptive prefetcher 110 also does not prefetch and cache any segments ahead of the current segment requested by the single client 120, once again, due to the single client 120 representing minimal demand for the first stream.

The adaptive prefetcher 110 enables caching and prefetching for the second stream in response to the demand from the first set of ten clients 130 exceeding a first threshold set for enabling the prefetching operations. Any segment of the second stream that is retrieved from the remote storage 150 and served in response to a first request from the first set of ten clients 130 for that segment is cached by the adaptive prefetcher 110. Accordingly, subsequent requests for the same segment of the second stream from the first set of ten clients 130 can be served locally from the adaptive prefetcher 110 cache without subsequent retrieval from the remote storage 150. Additionally, the adaptive prefetcher 110 prefetches and caches two segments of the second stream ahead of a current or most recent segment requested by the first set of ten clients 130, wherein the prefetching causes the adaptive prefetcher 110 to retrieve the two segments from remote storage 150 before receiving any client requests for those segments. When any client of the first set of ten clients 130 requests a prefetched segment, the adaptive prefetcher 110 will have already initiated the retrieval of that segment or will have cached the segment as a result of having completed the retrieval. Accordingly, the client request can be satisfied in less time by serving the prefetched segment from the adaptive prefetcher 110 cache than when initiating the retrieval of the requested segment from the remote storage 150 after arrival of the client request.

As client playback position advances and a client of the first set of ten clients 130 submits a first request for a segment after the prefetched segments of the second stream, the adaptive prefetcher 110 retrieves the requested segment and, once again, prefetches the next two segments. The adaptive prefetcher 110 continues with the two segment prefetch window so long as there is not a substantial number of clients joining or leaving the first set of ten clients 130 requesting the second stream at the time of the request. The adaptive prefetcher 110 reduces the prefetch window (and prefetches less than two segments) should the number of concurrent clients requesting segments of the second stream fall below the first threshold. Alternatively, the adaptive prefetcher 110 increases the prefetch window (and prefetches more than two segments) should the number of concurrent clients requesting segments of the second stream increase past a second threshold.

The increased prefetch window size is demonstrated with respect to the third stream. The adaptive prefetcher 110 enables caching and prefetching for the third stream, although the prefetching operations are different than those performed for the second stream. The difference in the prefetching operations performed by the adaptive prefetcher 110 for the second stream and third stream is due to the greater demand for the third stream from the second set of fifty clients 140 than for the second stream from the first set of ten clients 130.

The demand for the third stream from the second set of fifty clients 140 exceeds a second threshold set for enabling the prefetching operations. In response to the demand triggering the second threshold, any segment of the third stream that is retrieved and served in response to a first request from the second set of fifty clients 140 for that segment is cached locally by the adaptive prefetcher 110. Additionally, the adaptive prefetcher 110 prefetches and caches four segments of the third stream ahead of the current or most recent segment requested by the second set of fifty clients 140, wherein the prefetching, once again, involves the adaptive prefetcher 110 retrieving the four segments from remote storage 150 prior to the adaptive prefetcher 110 receiving any requests for the four segments.

In FIG. 1, the adaptive prefetcher 110 increases the prefetch window from two segments as used for the second stream to four segments for the third stream. The increase in the prefetch window is because of the greater demand for the third stream than the second stream. The greater demand increases the likelihood that one or more of the clients from the second set of fifty clients 140 will request each of the prefetched segments even as other clients switch to different bitrates, skip to different positions in the third stream, or halt the third stream playback altogether, thereby ensuring that the prefetching of additional segments is not wasteful in terms of network and cache utilization.

The prefetch window sizes used in FIG. 1 are for exemplary purposes. Different embodiments can set different prefetch window sizes for the different prefetch triggering thresholds. Different embodiments can also define the different thresholds or demand at which prefetching is performed with the different prefetch windows. For instance, the adaptive prefetcher can be configured with a third threshold that triggers prefetching of three segments ahead of client playback position for a stream requested by twenty clients.

The adaptive prefetching operation illustrated in FIG. 1 is with respect to a live stream in which the playback position of the requesting clients for a particular stream is at or near the same segment. Accordingly, the adaptive prefetcher can perform one prefetching operation for all clients requesting a same stream.

Embodiments are also provided for the adaptive prefetching of on-demand streams in which the playback position of the requesting clients for a particular stream may be different. The adaptive prefetcher accommodates prefetching for an on-demand stream that is requested by different clients by prefetching segments based on each client's playback position. For instance, a first client may request segment 1234 of a particular stream and a second client may request segment 90 of the particular stream. If the prefetch window is set to three segments based on the demand for the particular stream, the adaptive prefetcher prefetches segments 1235, 1236, and 1237 of the particular stream for the first client and the prefetches segments 91, 92, and 93 of the particular stream for the second client. If the prefetched segments for one client are cached and can be passed to a second client, then no prefetching is performed for the second client.

Figure 2:
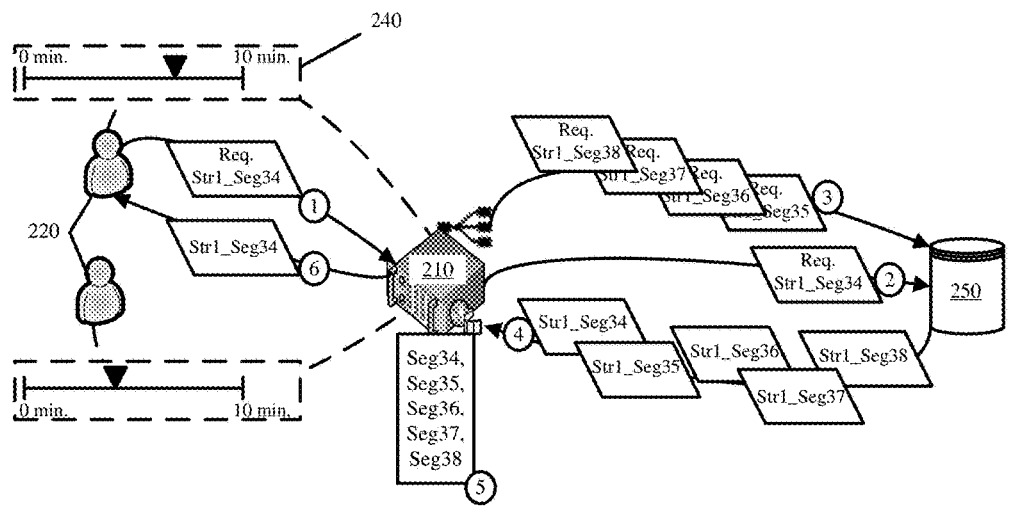
FIG. 2 conceptually illustrates adapting the segment prefetch window of the adaptive prefetcher based on demand derived from the playback duration of a particular stream by one or more clients in accordance with some embodiments.
Figure 2:
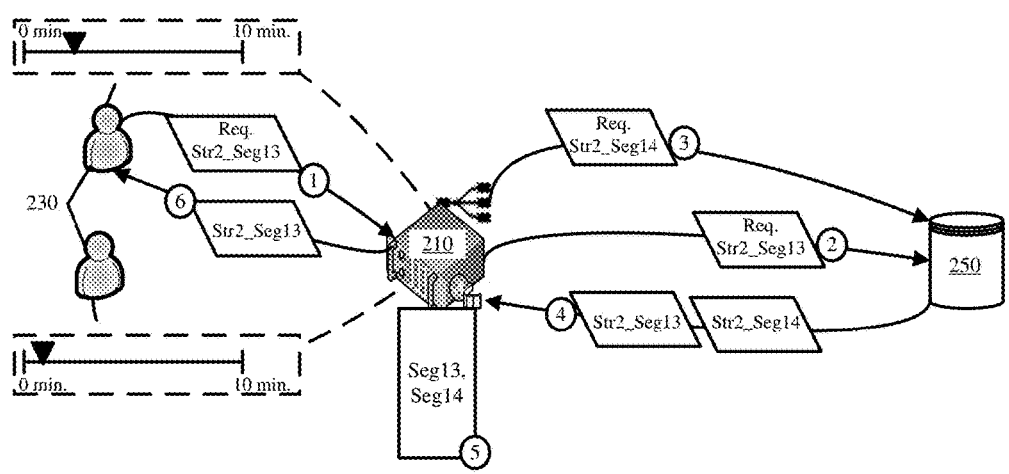

FIG. 2 conceptually illustrates adapting the segment prefetch window of the adaptive prefetcher 210 based on demand derived from the playback duration of a particular stream by one or more clients in accordance with some embodiments. The figure illustrates different clients requesting segments for different streams from the adaptive prefetcher 210. In particular, first and second clients 220 request segments of a first stream from the adaptive prefetcher 210, and third and fourth clients 230 request segments of a second stream from the adaptive prefetcher 210.

The adaptive prefetcher 210 tracks the playback duration of the first stream by the first and second clients 220 as well as the playback duration of the second stream by the third and fourth clients 230. The playback duration is tracked with the adaptive prefetcher 210 monitoring how long, on average, each requesting client views a requested stream. The tracking can be derived from the number of segments each client requests from the adaptive prefetcher 210 or by simply keeping a timer (e.g., 240) from when each client began requesting segments for a given stream. The first and second clients 220 average five minutes of the first stream playback. The third and fourth clients 230 average one minute of the second stream playback.

The adaptive prefetcher 210 is configured with different prefetching thresholds for different playback durations. In this figure, the playback duration of one minute for the second stream triggers a first prefetch threshold while the playback duration of five minutes for the first stream triggers a second prefetch threshold.

The different prefetch thresholds specify different prefetch windows for the number of segments to prefetch ahead of the current client playback position. The adaptive prefetcher 210 prefetches one segment ahead of the current client playback position for the second stream in response to triggering of the first prefetch threshold. The adaptive prefetcher 210 prefetches five segments ahead of the current client playback position for the first stream in response to triggering of the second prefetch threshold. Here again, prefetching involves the adaptive prefetcher 210 requesting and retrieving segments from remote storage 250 in response to a request for a segment immediately preceding the prefetched segments and before any client requests the prefetched segments from the adaptive prefetcher 210. The prefetched segments are cached in local memory of the adaptive prefetcher 210. When a subsequently arriving client request for a prefetched segment is received by the adaptive prefetcher 210, the adaptive prefetcher 210 simply retrieves and serves the requested prefetched segment from local memory. The adaptive prefetcher 210 does not submit requests to or otherwise access the remote storage 250 in response to the client request for the prefetched segment.

A larger prefetch window is used for the first stream because the longer playback duration of five minutes indicates a higher likelihood that the clients 220 will continue watching the stream or watch the entire stream, and thereby request the prefetched segments. A smaller prefetch window is used for the second stream because the shorter playback duration of one minute indicates a higher likelihood that the clients 230 may lose interest and switch away from the second stream, and thereby not request all the prefetched segments.

The adaptive prefetcher 210 continually tracks and updates the playback duration for the different streams. In some embodiments, the tracking occurs in real-time. Over time, the playback duration for the second stream may increase, which in turn, may cause the adaptive prefetcher 210 to increase the prefetch window for the second stream and prefetch more than one segment ahead of current client playback position.

In some embodiments, the adaptive prefetcher tracks the playback duration with a simple average, weighted average, moving average, or other statistical measure for the amount of time different clients spend watching a stream. The tracking can be based on a current set of clients requesting the stream. The tracking can also account for historic playback duration of clients that previously requested or watched the stream and are no longer requesting segments of the stream from the adaptive prefetcher.

The adaptive prefetching operation illustrated in FIG. 2, like that of FIG. 1, is with respect to a live stream in which the playback position of the requesting clients for a particular stream is at or near the same segment. Here again, the adaptive prefetching operation can be modified to accommodate on-demand streams in which the different clients requesting a same stream are at different playback positions, wherein the modifications involve prefetching different segments of the same stream based on the different playback positions of the clients requesting that stream.

Figure 3:
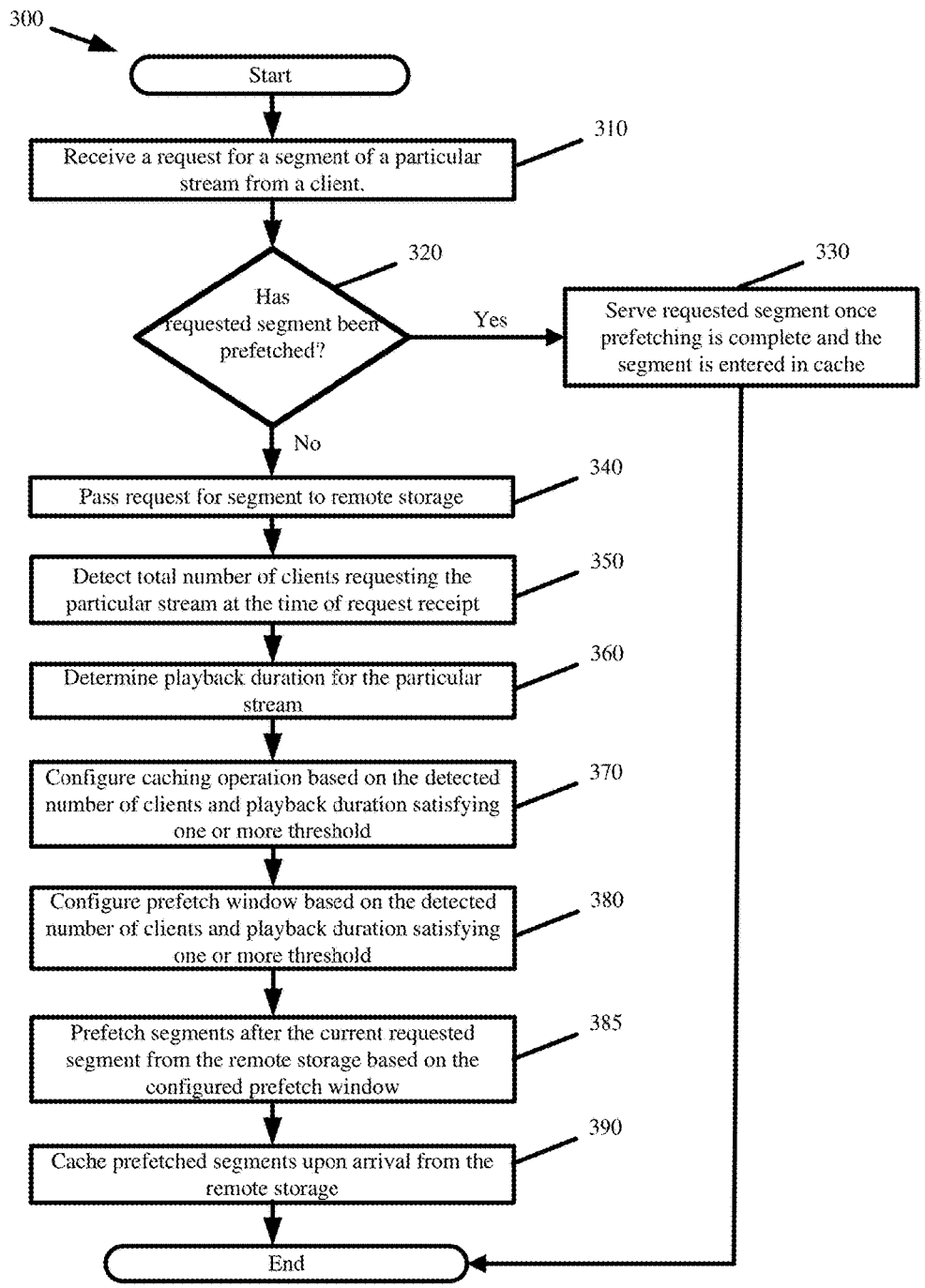
FIG. 3 presents a process for adapting the prefetching operations of the adaptive prefetcher based on a number of concurrent active clients and playback duration by the clients in accordance with some embodiments.

FIG. 3 presents a process 300 for adapting the prefetching operations of the adaptive prefetcher based on a number of concurrent active clients and playback duration by the clients in accordance with some embodiments. The process 300 is performed by the adaptive prefetcher of some embodiments.

The process 300 commences in response to the adaptive prefetcher receiving (at 310) a request for a segment of a particular stream from a client. The request is encapsulated in a messaging format of a supported streaming protocol. Preferred embodiments operate in conjunction with adaptive HyperText Transfer Protocol (HTTP) streaming protocols such as HTTP Live Streaming (HLS), HTTP Dynamic Streaming (HDS), Microsoft Smooth Streaming (MSS), and Dynamic Adaptive Streaming over HTTP (DASH). Other streaming protocols are supported as the adaptive prefetcher can be modified to work with any streaming protocol or standard Internet protocol used for the network transmission of media content streams.

In response to the received request, the process determines (at 320) whether the requested segment has been prefetched or is in the process of being prefetched as a result of an earlier request for an earlier segment of the particular stream. A prefetched segment may be stored to cache, therefore the determination at step 320 can be concluded by inspecting the cache. Alternatively, a prefetched segment may be in the process of being retrieved to cache in which case the adaptive prefetcher sets a flag or maintains a table for segments being prefetched. Identification of the flag or corresponding entry in the table can be used to make the determination at step 320.

In response to the requested segment being prefetched, the process waits until the segment arrives from remote storage or is present in cache before serving (at 330) to the requesting client. The process then terminates.

In response to the requested segment not being prefetched and not residing in cache, the process passes (at 340) the request to remote storage in order to imitate retrieval of the segment. The process also determines whether the request triggers any of the adaptive prefetching operations of the adaptive server.

The process detects (at 350) the total number of clients requesting the particular stream at the time of request receipt. The detection can be based on the number of different client Internet Protocol (IP) addresses requesting the particular stream. Alternatively, the detection can be based on the number of connections established with the adaptive prefetcher over which requests for the Uniform Resource Locator (URL) associated with the particular stream are received. In some embodiments, the adaptive prefetcher maintains in memory a separate counter for the number of active clients requesting each stream. The process also determines (at 360) the playback duration for the particular stream. The determination can be based on tracking how many segments of the particular stream have been requested by each of the clients detected at step 350. In some embodiments, the adaptive prefetcher further maintains a duration parameter for each stream. The duration parameter for a particular stream tracks the derived playback duration for that particular stream.

The process configures (at 370) caching operation and further configures (at 380) the prefetch window based on the detected number of clients and playback duration satisfying one or more thresholds. In some embodiments, different thresholds can be defined for different streams. In some other embodiments, the same thresholds are defined for all streams requested from the adaptive prefetcher.

The process prefetches (at 385) segments after the current requested segment from the remote storage based on the configured prefetch window before any of the prefetched segments are requested by clients. Prefetching involves isolating the identifier for the requested segment from the URL of the received request, identifying the segment iterator from the identifier, generating prefetch request URLs by incrementing the segment iterator for each segment to prefetch, and passing the generated prefetch request URLs to the remote storage.

Figure 4:
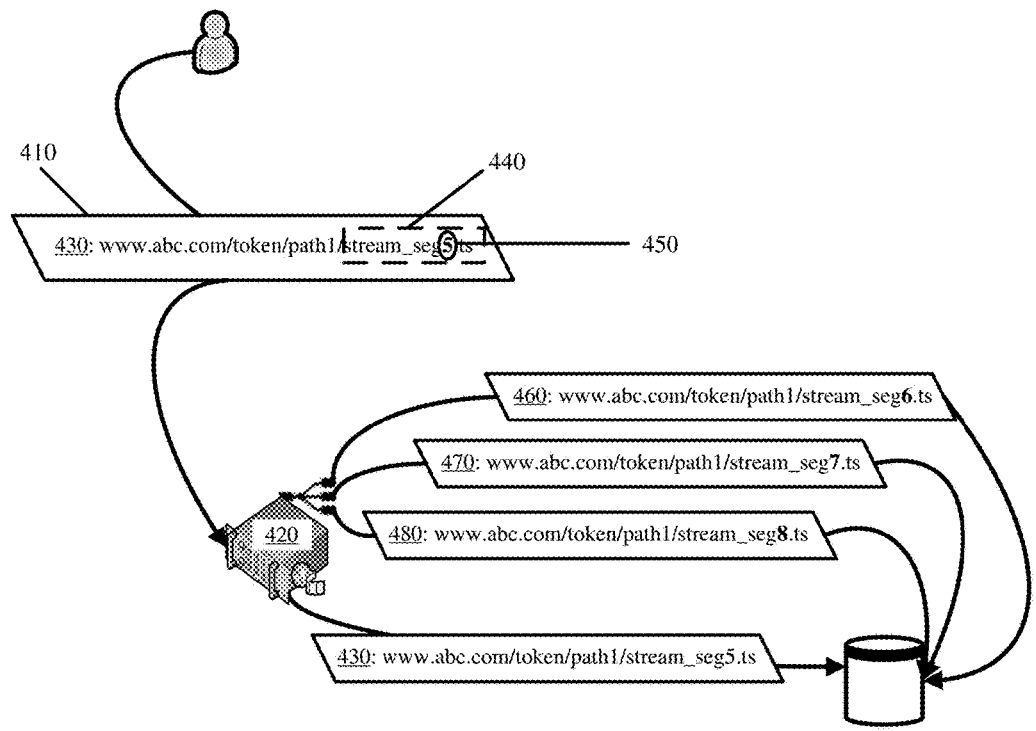
FIG. 4 conceptually illustrates generating the prefetch request URLs in accordance with some embodiments.

FIG. 4 conceptually illustrates generating the prefetch request URLs in accordance with some embodiments. The figure illustrates a client issued request 410 received by the adaptive prefetcher 420, the URL 430 of the request 410, the identifier 440 for the requested segment isolated from the request URL 430, and the segment iterator 450 extracted from the identifier 440. The figure further illustrates incrementing the iterator by one, two, and three in order to generate three prefetch request URLs 460, 470, and 480. The prefetch request URLs 460, 470, and 480 are used to prefetch three segments immediately following the segment requested by the client issued request as a result of the incremented iterator in each of the prefetch request URLs 460, 470, and 480. Additional implementations for generating prefetch requests are disclosed in U.S. patent application Ser. No. 15/392,268, the contents of which are incorporated herein by reference.

With reference back to FIG. 3, the process caches (at 390) the prefetched segments upon arrival from the remote storage. The caching stores copies of the prefetched segments in memory of the adaptive prefetcher so that the prefetched segments can be served locally from memory without need for initiating a retrieval operation in response to a subsequently arriving client request. Steps 385 and 390 may be optional and not performed as a result of the demand or conditions associated with the particular stream not triggering prefetching by the adaptive prefetcher.

The adaptive prefetcher is integrated with or runs as part of a streaming server. By coupling with the streaming server, the adaptive prefetcher can distribute one or more media content streams over a digital network, such as the Internet, to different clients in response to stream segment requests from those clients. The adaptive prefetcher can also serve different streams from the same or different content providers. The adaptive prefetcher also has local memory or can share memory of the streaming server in order to cache requested and prefetched segments of different streams and other content.

The adaptive prefetcher can be deployed within a content delivery network (CDN), cloud distribution service, hosting provider, streaming service, or other digital network based deliverer of content. In such context, a single adaptive prefetcher typically cannot handle the load from an aggregate set of clients requesting the same viral or popular stream or the aggregate load from serving multiple streams simultaneously to different clients. Accordingly, some embodiments deploy two or more adaptive prefetchers in a point-of-presence (PoP). The adaptive prefetchers of a PoP interoperate to divvy the load from multiple concurrent clients requesting the same stream or the load associated from serving multiple streams that are accessible from the PoP.

Such PoP deployments can however skew the prefetching operations of the adaptive prefetchers when each adaptive prefetcher of the PoP independently tracks the number of concurrent clients requesting a particular stream from that adaptive prefetcher and not other adaptive prefetchers of the PoP. Similarly, the prefetching operations can be skewed when each adaptive prefetcher of the PoP independently tracks playback duration by the concurrent clients requesting a particular stream from that adaptive prefetcher and not other adaptive prefetchers of the PoP. For example, five clients may receive a particular stream from a first adaptive prefetcher of a PoP and another seven clients may receive the particular stream from a different second adaptive prefetcher of the PoP. The first adaptive prefetcher may set its prefetch window according to the five clients requesting the particular stream from the first adaptive prefetcher, and the second adaptive prefetcher may set its prefetch window according to the seven clients requesting the same particular stream from the second adaptive prefetcher. However, it is more accurate to key the prefetching operations of the first and second adaptive prefetchers off the total number of concurrent clients which is the sum of clients requesting the particular stream from the PoP (i.e., twelve clients).

Some embodiments provide a master-slave implementation for the adaptive prefetchers of a PoP. The master-slave implementation triggers and configures the prefetch operations based on a holistic accounting of the conditions associated with the streams served from the PoP regardless of which adaptive prefetchers serve which stream. Stated differently, the master-slave implementation triggers and configures the prefetch operations based on the aggregate conditions associated with the clients accessing different streams from the PoP regardless of which adaptive prefetchers of the PoP the streams are accessed from.

In some such embodiments, a designated master daemon executes on one of the adaptive prefetchers of the PoP. Slave daemons execute on the other adaptive prefetchers of the PoP. The slave daemons communicably couple to the master daemon by establishing a connection to the master daemon.

The slave daemons report conditions associated with streams they serve back to the master daemon. For each stream served from the adaptive prefetcher, the corresponding slave daemon reports one or more of the number of concurrent clients requesting that stream and the playback duration for that stream.

In some embodiments, the slave daemons report to the master daemon when there is an updated condition. For example, a slave daemon may update the master daemon when a new client begins requesting a stream or an existing client stops requesting a stream. The slave daemons may alternatively periodically provide updates for the playback duration of different streams to the master daemon.

The master daemon compiles the reported conditions from the slave daemons. The master daemon thereby holistically tracks the total number of concurrent clients requesting different streams from the PoP or the playback duration for different streams served from the PoP regardless of whether the streams are served from one or more adaptive prefetchers.

In some embodiments, the master daemon provides the compiled conditions to the slave daemons over the established connections. The slave daemons then trigger and configure their respective prefetching operations for the underlying adaptive prefetcher based on the compiled conditions rather than the conditions independently tracked by the underlying adaptive prefetcher.

In some other embodiments, the slave daemons directly query the master daemon for the prefetch operation configuration parameters (e.g., prefetch window size). In other words, the master daemon triggers and configures the adaptive prefetching operations on behalf of the adaptive prefetchers running the slave daemons.

The slave daemons can query the master daemon for the compiled conditions or prefetching operation for a particular stream upon receiving any segment request for that particular stream. Alternatively, the slave daemons can restrict the querying to when a new client initiates a request for a segment of the particular stream.

Figure 5:
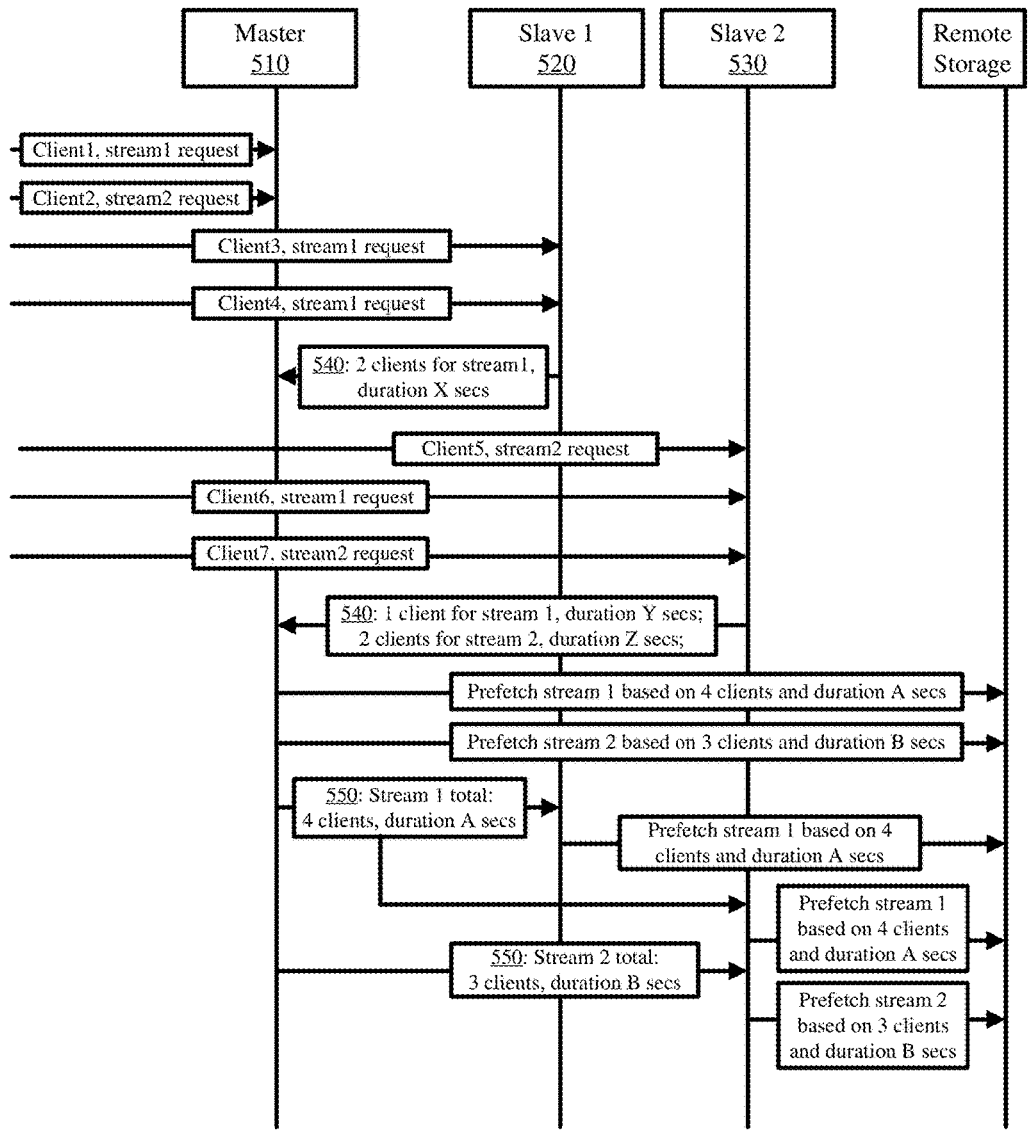
FIG. 5 conceptually illustrates the master-slave implementation and holistic condition tracking and reporting amongst adaptive prefetchers of a PoP in accordance with some embodiments.

FIG. 5 conceptually illustrates the master-slave implementation and holistic condition tracking and reporting amongst adaptive prefetchers of a PoP in accordance with some embodiments. The figure illustrates a first adaptive prefetcher 510 running a master daemon instance and two adaptive prefetchers 520 and 530 running slave daemon instances.

Two different streams are served by the three adaptive prefetchers 510, 520, and 530 with the master adaptive prefetcher 510 receiving requests for the first stream from one client and requests for the second stream from another client, the first slave adaptive prefetcher 520 receiving requests from two different clients for the first stream, and the second slave adaptive prefetcher 530 receiving requests from one client for the first stream and requests from two clients for the second stream.

The designated master adaptive prefetcher 510 collects (at 540) conditions associated with the two streams from the two slave adaptive prefetchers 520 and 530. The conditions aggregated by the master adaptive prefetcher 510 are shared (at 550) with the slave adaptive prefetchers 520 and 530 so that the prefetching operations triggered and configured by each adaptive prefetcher 510, 520, and 530 accounts for all load of a stream regardless of how many different adaptive prefetchers are involved in handling the load. Rather than share the aggregate conditions, the master adaptive prefetcher 510 can configure or set the parameters for the prefetching operations of the slave adaptive prefetchers 520 and 530 at step 550.

The master-slave implementation can also be extended for inter-PoP adaptive prefetching triggering and configuration. In some such embodiments, the master daemons of different PoPs communicably couple with one another. As a particular stream becomes popular in a first PoP, the master daemon in the first PoP can send aggregate conditions associated with the particular stream or adaptive prefetching configuration information to the master daemons of the other PoPs. The other PoPs can then key their prefetching operations based on the conditions associated with the particular stream at the first PoP. Alternatively, the master daemons can exchange compiled conditions from their respective PoP with the master daemons of the other PoPs so there is a network wide holistic accounting for the conditions associated with each stream.

Some embodiments provide peer adaptive prefetching when multiple adaptive prefetchers in the same PoP are tasked with serving segments of the same stream. Rather than have each adaptive prefetcher prefetch the same segments from the remote storage, the peer adaptive prefetching designates one of the adaptive prefetchers as the master instance performing the adaptive prefetching for the particular stream from the remote storage. The other adaptive prefetchers prefetch segments from the master instance rather than the remote storage.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 6:
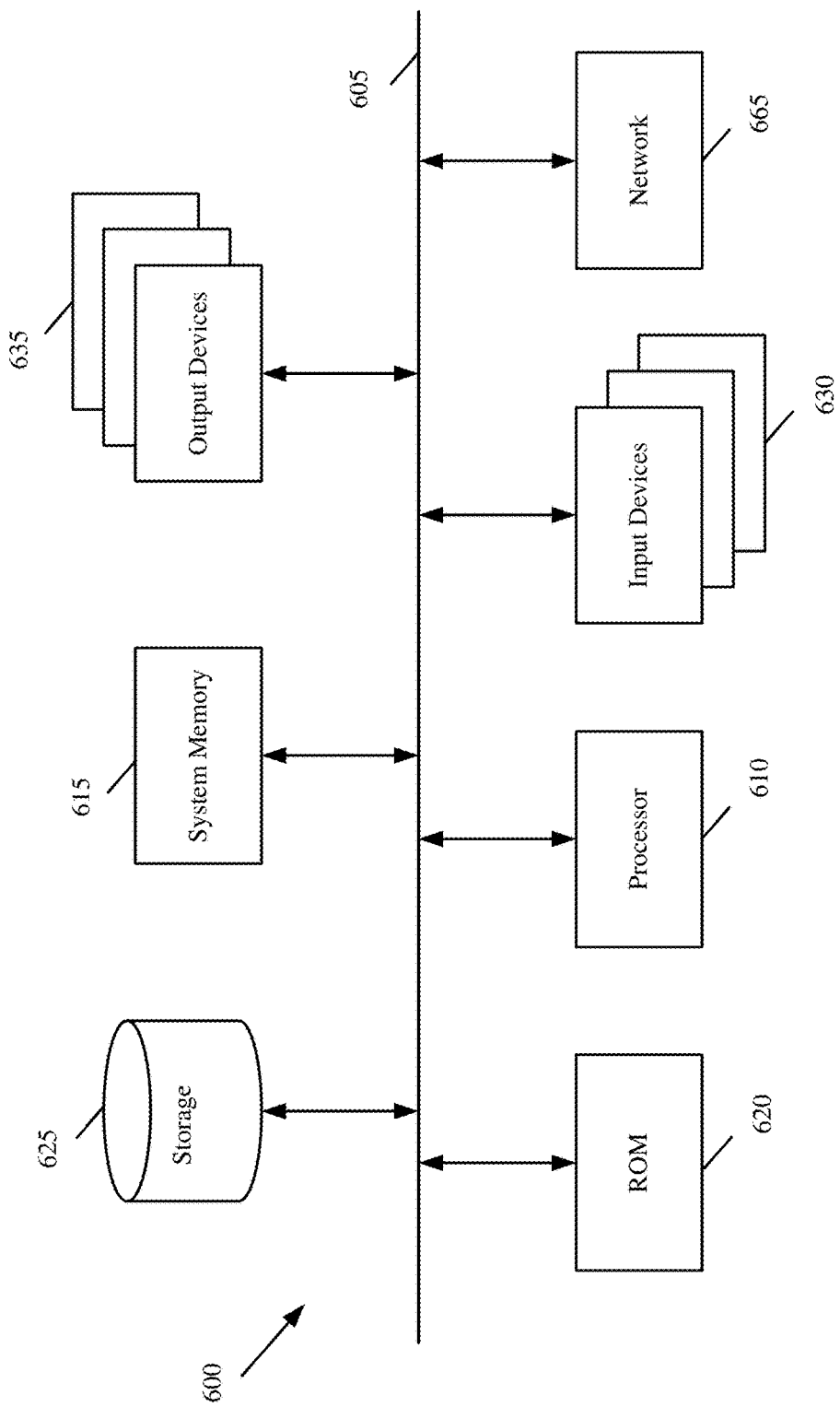
FIG. 6 illustrates a computer system or server with which some embodiments are implemented.

FIG. 6 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device. Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices. The input devices 630 also include audio input devices (e.g., microphones, MIDI musical instruments, etc.). The output devices 635 display images generated by the computer system. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method for adaptive prefetching of a stream, the method comprising:
   receiving a request directed to a particular segment of a particular stream from a client, the particular stream encoded as a plurality of segments;
   detecting a number of clients concurrently requesting said particular stream;
   prefetching a first set of segments immediately following said particular segment in the particular stream in response to the number of clients exceeding a first threshold and not a second threshold, wherein said prefetching the first set of segments comprises retrieving each segment of the first set of segments from remote storage before receiving a client request for a segment within the first set of segments; and
   prefetching a second set of segments immediately following said particular segment in the particular stream in response to the number of clients exceeding said first threshold and said second threshold, wherein said prefetching the second set of segments comprises retrieving each segment of the second set of segments from remote storage before receiving a client request for a segment within the second set of segments, and wherein said second set of segments comprises said first set of segments and at least one additional segment of the particular stream not in the first set of segments.

2. The method of claim 1, wherein prefetching the first set of segments comprises caching in memory, segments retrieved from the remote storage in response to said prefetching the first set of segments.

3. The method of claim 2 further comprising receiving after said prefetching the first set of segments, a second request directed to a prefetched segment in the first set of segments.

4. The method of claim 3 further comprising responding to said second request by serving said prefetched segment from memory without initiating a retrieval of said prefetched segment from the remote storage in response to said receiving the second request.

5. The method of claim 1 further comprising tracking playback duration of the particular stream by the clients concurrently requesting said particular stream.

6. The method of claim 5 further comprising increasing a number of segments included in the first set of segments prior to said prefetching of the first set of segments in response to the playback duration from said tracking exceeding a threshold amount.

7. The method of claim 6 further comprising decreasing a number of segments included in the first set of segments prior to said prefetching of the first set of segments in response to the playback duration from said tracking not exceeding the threshold amount.

8. A method for adaptive prefetching of a stream, the method comprising:
   receiving a request directed to a particular segment of a particular stream from a client;
   tracking playback duration of the particular stream by a set of clients requesting said particular stream;
   prefetching a first set of segments immediately following said particular segment in the particular stream in response to the playback duration by the set of clients exceeding a first threshold and not a second threshold, wherein said prefetching the first set of segments comprises retrieving each segment of the first set of segments from remote storage before receiving a client request for a segment within the first set of segments; and
   prefetching a second set of segments immediately following said particular segment in the particular stream in response to the playback duration by the set of clients exceeding said first threshold and said second threshold, wherein said prefetching the second set of segments comprises retrieving each segment of the second set of segments from remote storage before receiving a client request for a segment within the second set of segments, and wherein said second set of segments comprises said first set of segments and at least one additional segment of the particular stream not in the first set of segments.

9. The method of claim 8, wherein tracking the playback duration comprises monitoring an amount of time each client from the set of clients views the particular stream.

10. The method of claim 8, wherein tracking the playback duration comprises tracking a number of segments of the particular stream requested by each client of the set of clients.

11. The method of claim 8 further comprising detecting a number of clients in the set of clients requesting said particular stream.

12. The method of claim 11, wherein prefetching the first set of segments further comprises configuring a number of segments to prefetch as part of the first set of segments based on the playback duration exceeding the first threshold and said number of clients.

13. The method of claim 8 further comprising retrieving the particular segment from the remote storage and serving the particular segment in response to receiving said request.

14. The method of claim 13 further comprising caching in local memory, the particular segment and the first set of segments in response to receiving said request directed to the particular segment and said prefetching of the first set of segments.

15. The method of claim 14 further comprising responding to a subsequent request for a first segment from the first set of segments by retrieving and sending the first segment from said local memory without further retrieving or accessing of the remote storage.

16. A method comprising:
receiving a first request directed to a first segment of a particular stream, the particular stream encoded as a plurality of segments;
monitoring initial conditions associated with a set of clients streaming the particular stream at a time of receiving said first request;
prefetching in response to said receiving the first request, a first set of segments comprising a first number of segments set according to said initial conditions, wherein the first set of segments immediately follow said first segment in the particular stream;
receiving a second request directed to a second segment of the particular stream immediately following the first set of segments;
monitoring changed conditions associated with the set of clients streaming the particular stream at a time of receiving said second request, wherein said changed conditions differ from said initial conditions; and
prefetching in response to said receiving the second request, a second set of segments comprising a different second number of segments set according to said changed conditions, wherein the second set of segments immediately follow said second segment in the particular stream.

17. The method of claim 16, wherein said changed conditions differ from said initial conditions by at least one client joining or leaving said set of clients from the time of receiving said first request to the time of receiving said second request.

18. The method of claim 17, wherein prefetching the second set of segments further comprises increasing a number of segments to prefetch from the first number of segments to the second number of segments as a result of the set of clients increasing in number from monitoring said initial conditions to monitoring said changed conditions.

19. The method of claim 16, wherein said changed conditions differ from said initial condition by at least one of an increase or decrease in average playback duration of the particular stream by the set of clients from the time of receiving said first request to the time of receiving said second request.

20. The method of claim 19, wherein prefetching the second set of segments further comprises decreasing a number of segments to prefetch from the first number of segments to the second number of segments as a result of the average playback duration declining from monitoring said initial conditions to monitoring said changed conditions.

* * * * *